United States Patent
Cao et al.

(10) Patent No.: US 11,044,669 B2
(45) Date of Patent: Jun. 22, 2021

(54) WAKEUP RADIO (WUR) PREAMBLE DESIGN

(71) Applicant: Marvell Asia Pte, Ltd., Singapore (SG)

(72) Inventors: Rui Cao, Fremont, CA (US); Hongyuan Zhang, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/773,521

(22) Filed: Jan. 27, 2020

(65) Prior Publication Data
US 2020/0163016 A1 May 21, 2020

Related U.S. Application Data

(63) Continuation of application No. 15/985,480, filed on May 21, 2018, now Pat. No. 10,548,082.
(Continued)

(51) Int. Cl.
  *H04W 52/02* (2009.01)
  *H04W 28/06* (2009.01)
  *H04W 84/12* (2009.01)

(52) U.S. Cl.
  CPC ..... *H04W 52/0225* (2013.01); *H04W 28/065* (2013.01); *H04W 52/0235* (2013.01); *H04W 84/12* (2013.01)

(58) Field of Classification Search
  None
  See application file for complete search history.

(56) References Cited

U.S. PATENT DOCUMENTS

8,331,419 B2  12/2012  Zhang et al.
8,332,732 B2  12/2012  Lakkis
(Continued)

FOREIGN PATENT DOCUMENTS

CN  107800526 A  3/2018
WO  WO-2009/059229 A1  5/2009
WO  WO-2018/032774 A1  2/2018

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

(Continued)

*Primary Examiner* — Anh Vu H Ly

(57) ABSTRACT

A communication device generates a first portion of a wakeup packet that corresponds to a legacy physical layer protocol (PHY) preamble, and includes a first orthogonal frequency division multiplexing (OFDM) symbol that spans a first bandwidth and is modulated according to a modulation scheme. The communication device scrambles a plurality of information bits to generate scrambled information bits, and generates a second OFDM symbol to include the scrambled information bits. The second OFDM symbol spans the first bandwidth and is modulated according to the modulation scheme to signal to other communication devices that the wakeup packet does not conform to a communication protocol. The first communication device generates a second portion of the wakeup packet, which corresponds to a second bandwidth that is less than the first bandwidth. The communication device transmits the second OFDM symbol between the first portion of the wakeup packet and the second portion of the wakeup packet.

20 Claims, 7 Drawing Sheets

Related U.S. Application Data

(60) Provisional application No. 62/511,516, filed on May 26, 2017.

(56) References Cited

U.S. PATENT DOCUMENTS

| | | | |
|---|---|---|---|
| 8,527,853 | B2 | 9/2013 | Lakkis |
| 9,801,133 | B2 | 10/2017 | Min et al. |
| 9,826,483 | B2 | 11/2017 | Park et al. |
| 10,015,745 | B2 | 7/2018 | Azizi et al. |
| 10,129,064 | B1 | 11/2018 | Lee et al. |
| 10,548,082 | B2 | 1/2020 | Cao et al. |
| 2006/0067444 | A1 | 3/2006 | Hamamoto |
| 2010/0166113 | A1 | 7/2010 | Farley et al. |
| 2014/0112225 | A1 | 4/2014 | Jafarian et al. |
| 2015/0208349 | A1 | 7/2015 | Ramamurthy et al. |
| 2016/0366644 | A1 | 12/2016 | Ghosh et al. |
| 2016/0374020 | A1 | 12/2016 | Azizi et al. |
| 2017/0094600 | A1 | 3/2017 | Min et al. |
| 2017/0111858 | A1 | 4/2017 | Azizi et al. |
| 2018/0019902 | A1 | 1/2018 | Suh et al. |
| 2018/0020405 | A1 | 1/2018 | Huang et al. |
| 2018/0020409 | A1 | 1/2018 | Aboul-Magd et al. |
| 2018/0132176 | A1 | 5/2018 | Abraham et al. |
| 2018/0176053 | A1* | 6/2018 | Park ................. H04W 52/0229 |
| 2018/0184378 | A1 | 6/2018 | Fang et al. |
| 2018/0184379 | A1 | 6/2018 | Liu et al. |
| 2018/0206192 | A1 | 7/2018 | Vermani et al. |
| 2018/0255514 | A1 | 9/2018 | Sun et al. |
| 2018/0324717 | A1 | 11/2018 | Zhou et al. |
| 2018/0343614 | A1 | 11/2018 | Cao et al. |
| 2018/0376370 | A1 | 12/2018 | Shellhammer et al. |
| 2019/0028968 | A1 | 1/2019 | Ma et al. |
| 2019/0036754 | A1* | 1/2019 | Lee ..................... H04L 27/2627 |
| 2019/0082385 | A1 | 3/2019 | Shellhammer et al. |
| 2019/0124596 | A1 | 4/2019 | Cao et al. |
| 2019/0191377 | A1* | 6/2019 | Park .................... H04L 5/0091 |
| 2019/0260624 | A1* | 8/2019 | Park ........................ H04L 27/02 |
| 2020/0092811 | A1* | 3/2020 | Park .................... H04L 27/2634 |
| 2020/0252968 | A1* | 8/2020 | Lv ........................ H04L 5/0053 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Park et al., "Proposal for Wake-Up Receiver (WUR) Study Group," IEEE Draft 802.11-16/0722r1, 14 pages (May 18, 2016).

International Search Report and Written Opinion in International Application No. PCT/US2018/0d3726, dated Aug. 14, 2018 (13 pages).

IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

U.S. Appl. No. 62/511,516, Cao et al., "Wake-Up Radio (WUR) Preamble Design," filed May 26, 2017.

U.S. Appl. No. 16/049,732, Balakrishnan et al., "Wakeup Radio (WUR) Packet Preamble Design," filed Jul. 30, 2018.

Communication in European Patent Application No. 18732198.9, dated Mar. 17, 2021 (8 pages).

\* cited by examiner

WAKEUP RADIO (WUR) PREAMBLE DESIGN

CROSS REFERENCES TO RELATED APPLICATIONS

This application is a continuation of U.S. patent application Ser. No., 15/985,480, entitled "Wakeup Radio (WUR) Preamble Design," filed on May 21, 2018, which claims the benefit of U.S. Provisional Patent Application No. 62/511,516, entitled "Wakeup Radio (WUR) Preamble Design," filed on May 26, 2017. Both of the applications referenced above are incorporated herein by reference in their entireties.

FIELD OF TECHNOLOGY

The present disclosure relates generally to wireless communication systems, and more particularly to wireless communication systems utilizing low power wakeup radios to implement power saving features.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wake up radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup packet addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment, a method includes: generating, at the first communication device, a first portion of a wakeup packet, wherein the first portion of the wakeup packet corresponds to a legacy physical layer protocol (PHY) preamble corresponding to a communication protocol, wherein the first portion of the wakeup packet includes a first orthogonal frequency division multiplexing (OFDM) symbol that spans a first bandwidth and is modulated according to a modulation scheme; generating, at the first communication device, a second OFDM symbol, wherein the second OFDM symbol spans the first bandwidth and is modulated according to the modulation scheme; generating, at the first communication device, a second portion of the wakeup packet, wherein the second portion of the wakeup packet corresponds to a second bandwidth that is less than the first bandwidth, and wherein the second portion of the wakeup packet does not conform to the communication protocol; and transmitting, by the first communication device, the wakeup packet, including transmitting, in time, the second OFDM symbol between the first portion of the wakeup packet and the second portion of the wakeup packet, and wherein the modulation of the second OFDM symbol according to the modulation scheme signals to third communication devices operating according to the communication protocol that the wakeup packet does not conform to the communication protocol.

In another embodiment, an apparatus comprises a network interface device associated with a first communication device. The network interface device includes one or more integrated circuits (ICs) configured to: generate a first portion of a wakeup packet, wherein the first portion of the wakeup packet corresponds to a legacy PHY preamble corresponding to a communication protocol, wherein the first portion of the wakeup packet includes a first OFDM symbol that spans a first bandwidth and is modulated according to a modulation scheme, generate a second OFDM symbol, wherein the second OFDM symbol spans the first bandwidth and is modulated according to the modulation scheme, generate a second portion of the wakeup packet, wherein the second portion of the wakeup packet corresponds to a second bandwidth that is less than the first bandwidth, and wherein the second portion of the wakeup packet does not conform to the communication protocol. The one or more ICs are also configured to transmit the wakeup packet, including transmitting, in time, the second OFDM symbol between the first portion of the wakeup packet and the second portion of the wakeup packet. The modulation of the second OFDM symbol according to the modulation scheme signals to third communication devices operating according to the communication protocol that the wakeup packet does not conform to the communication protocol.

DETAILED DESCRIPTION

Low power wakeup techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, the same or similar power saving techniques are utilized in other types of wireless communication systems such as personal area networks (PANs), mobile communication networks such as cellular networks, metropolitan area networks (MANs), satellite communication networks, etc.

In embodiments described below, an access point (AP) is configured to transmit a wakeup request packet to one or more client stations, causing the one or more client stations to transition from a low power state to an active state. In various embodiments, frame formats for wakeup packets are configured to avoid compatibility issues in communication networks that include multiple devices operating according to different communication protocols.

Figure 1A:
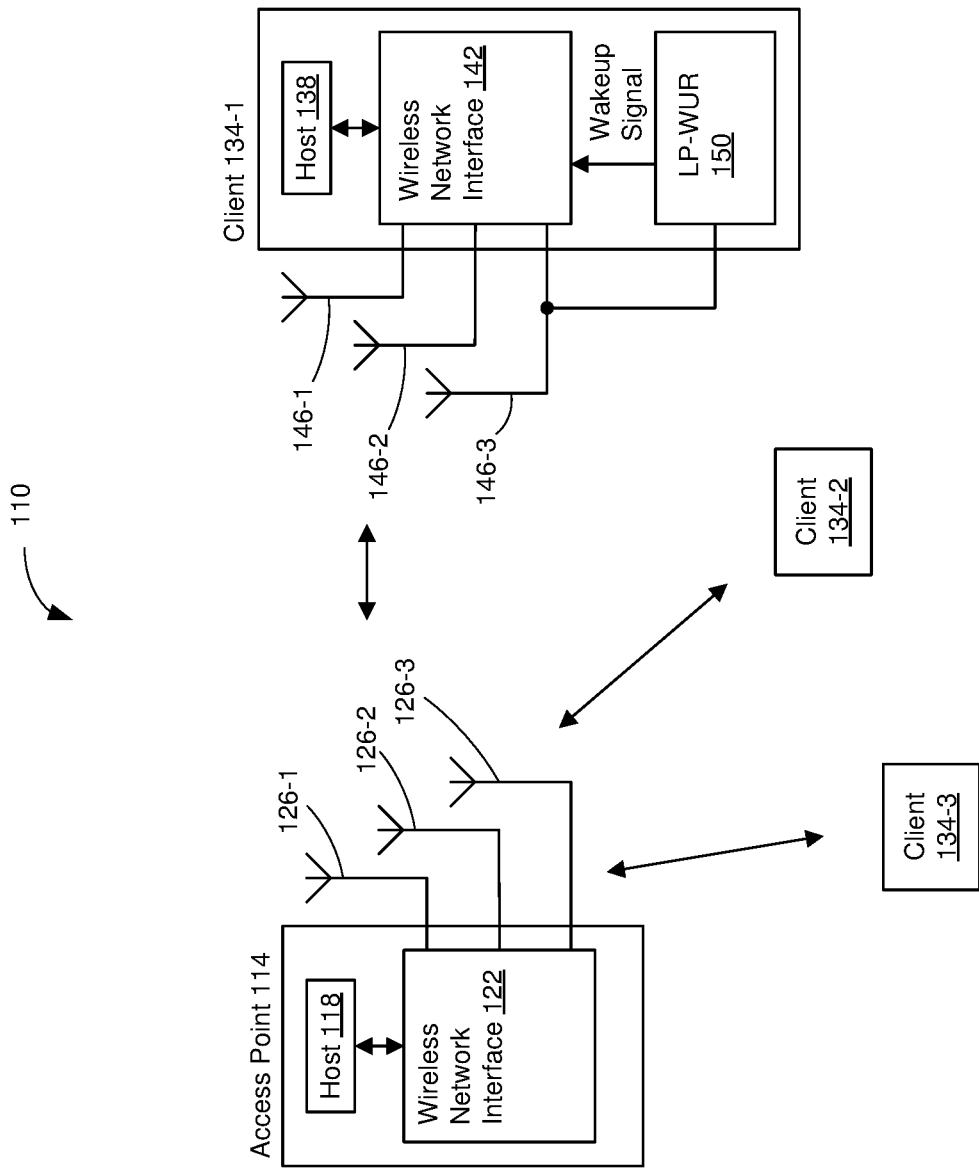
FIG. 1A is a block diagram of an example wireless local area network (WLAN) having a client station with a low power wake up radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by low power wake up radios (LP-WURs) in the WLAN 110.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to operate over a smaller bandwidth (e.g., less than 50%, less than 25%, less than 20%, less than 10%) than the operating bandwidth of the wireless network interface device 142 while the wireless network interface device 142 is in the active state, in an embodiment. For instance, in an embodiment, the LP-WUR 150 operates over a communication channel that is approximately 4 MHz wide (e.g. 4.06 MHz wide) while the wireless network interface device 142, in an active state, operates over a wider communication channel that is 20 MHz wide. In an embodiment, the LP-WUR 150 operates over a communication channel that is centered within the communication channel corresponding to the operating bandwidth of the wireless network interface device 142. In another embodiment however, the LP-WUR 150 is configured to operate over a bandwidth that is equal or substantially equal to an operating bandwidth of the wireless network interface device 142 while the wireless network interface device 142 is in the active state. In an embodiment, the wireless network interface device 142, in an active state, is further configured to operate over a communication channel that is wider than 20 MHz (e.g., 40 MHz, 80 MHz, 160 MHz, etc.).

The LP-WUR 150 is configured to receive and decode wakeup packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1C:
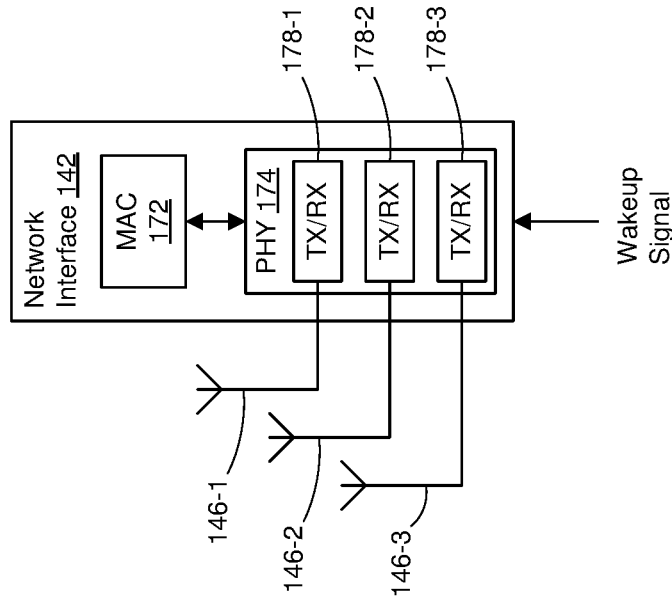
FIG. 1C is a block diagram of an example wireless network interface device of the client station included in the WLAN of FIG. 1A, according to an embodiment.
Figure 1B:
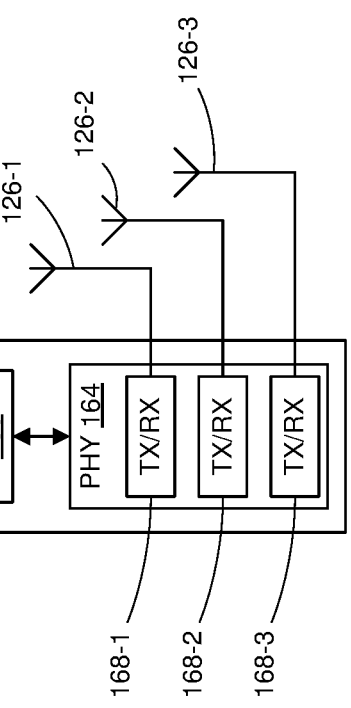
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface device 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface device 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface device 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

FIG. 1C is a block diagram of the network interface device 142 of the client station 134-1 of FIG. 1A, according to an embodiment. The network interface device 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface device 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface device 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client station 134-1 are configured to generate data units, and process received data units, that conform to the WLAN communication protocol such as a communication protocol conforming to the IEEE 802.11 Standard or another suitable wireless communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

Figure 1D:
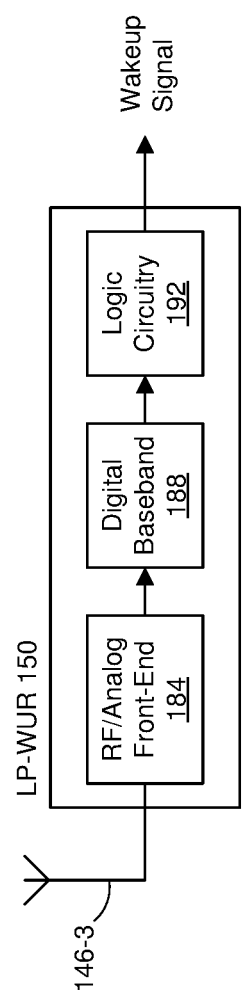
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a wakeup packet. The digital baseband circuitry 188 includes a demodulator that demodulates data from the digital baseband signal to generate an information signal corresponding to information included in a wakeup packet.

The digital baseband circuitry 188 is coupled to logic circuitry 192. The logic circuitry 192 is configured to process the information signal to determine whether a wakeup packet includes an address (e.g., a MAC address, an AID, or another suitable network address) corresponding to the client station 134-1, according to an embodiment. The logic circuitry 192 is configured to generate the wakeup signal in response to determining that a received wakeup packet includes the address corresponding to the client station 134-1. In various embodiments and/or scenarios, the network address included in the wakeup packet comprises a unicast address, a multicast address, or a broadcast address. For example, a broadcast network address generally corresponds to all client stations having an LP-WUR, according to an embodiment. As another example, a multicast network address corresponds to the client station 134-1 if the client station 134-1 has been assigned to a group of client stations (e.g., by the AP 114) that is associated with the multicast network address, according to an embodiment. As yet another example, a unicast network address may be assigned to the client station 134-1 at time of manufacture, assigned by the AP 114 when the client station 134 becomes associated with the network 110, etc., according to various embodiments.

Figure 2:
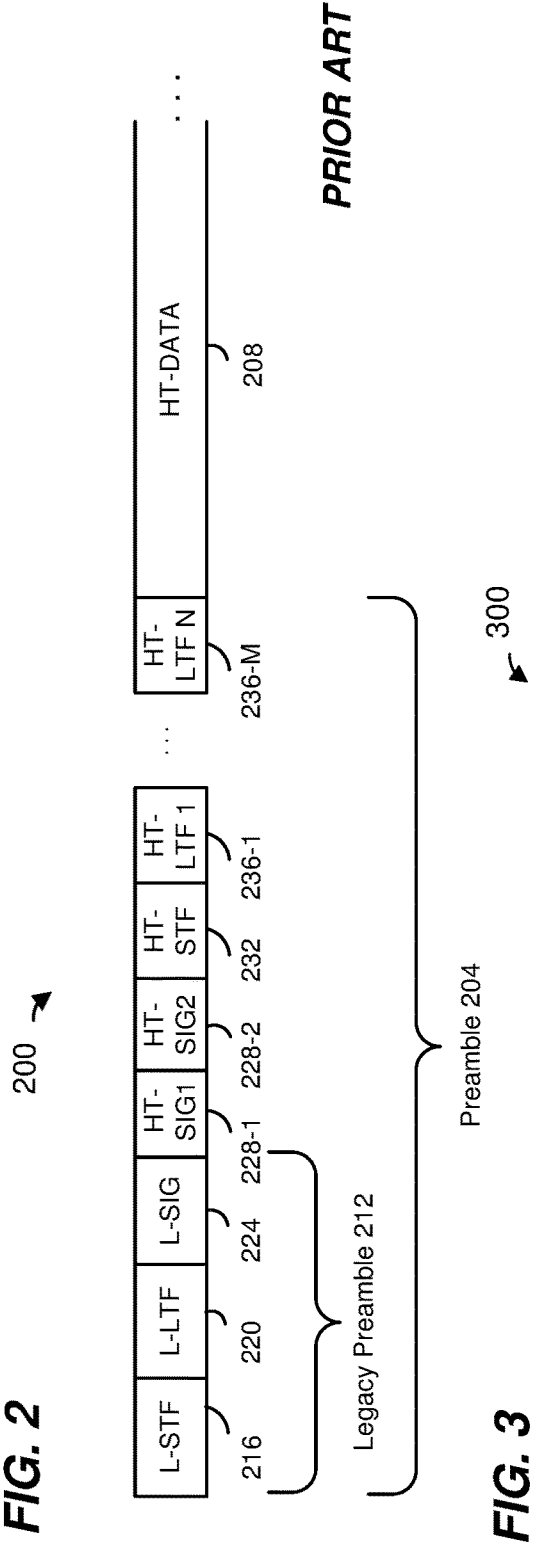
FIG. 2 is a block diagram of a prior physical layer protocol (PHY) data unit.

FIG. 2 is a diagram of a prior art PHY data unit 200 that conforms to the IEEE 802.11n Standard.

The PHY data unit 200 includes a PHY preamble 204 preamble and a PHY data portion 208. The PHY preamble 204 includes a legacy preamble portion 212, which includes a legacy short training field (L-STF) 216, a legacy long training field (L-LTF) 220, and a legacy signal field (L-SIG) 224. The L-STF 216 includes a defined signal (e.g., defined by the communication protocol) generally used for packet detection, initial synchronization, automatic gain control, etc. The L-LTF 220 includes a defined signal (e.g., defined by the communication protocol) generally used for channel estimation, fine synchronization, etc. The L-SIG 224 includes certain PHY parameters regarding the PHY data unit 200, such as a coding rate and a length, which together can be used to estimate a duration of the PHY data unit 200, according to an embodiment.

A format of the legacy portion 212 conforms to the IEEE 802.11a Standard such that a communication device that conforms to the IEEE 802.11a Standard and/or the IEEE 802.11g Standard (e.g., a legacy device), for example, but does not conform to the IEEE 802.11n Standard can use the legacy preamble 212 portion to detect the PHY data unit 200 and estimate a length of the PHY data unit 200. For example, the legacy device can detect the PHY data unit 200 by detecting the L-STF 216, for example, and can estimate a duration of the PHY data unit 200 using the L-SIG 224, for example.

The PHY preamble 204 also includes a high throughput signal field (HT-SIG) 228, a high throughput short training field (HT-STF) 232, and M high throughput long training fields (HT-LTFs) 236, where M is an integer generally determined by a number of spatial streams used to transmit the data unit 200 in a multiple input multiple output (MIMO) channel configuration. In particular, according to the IEEE 802.11n Standard, the data unit 200 includes two HT-LTFs 212 if the data unit 200 is transmitted using two spatial streams, and four HT-LTFs 212 if the data unit 200 is transmitted using three or four spatial streams. An indication of the particular number of spatial streams being utilized is included in the HT-SIG field 208.

Figure 3:
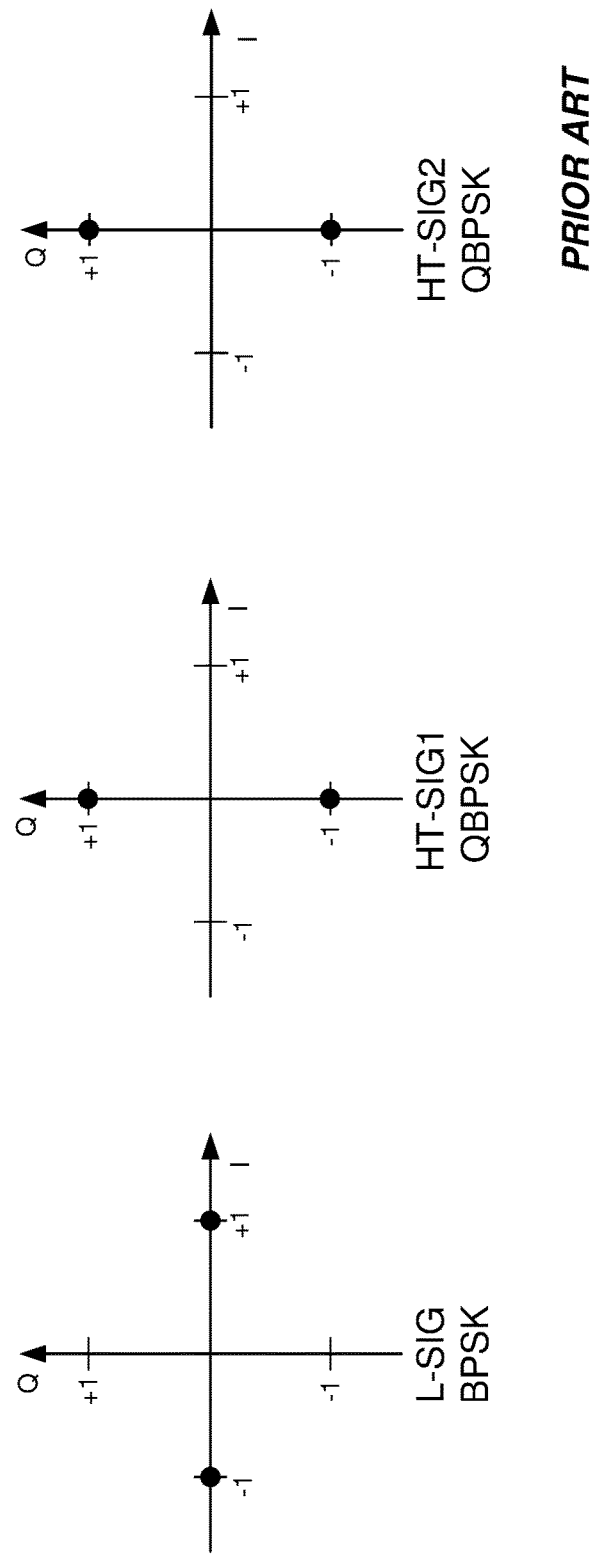
FIG. 3 is a diagram of a modulation scheme used to modulate fields in the prior art PHY data unit of FIG. 2.

FIG. 3 is a set of diagrams illustrating a modulation 300 of the L-SIG 206, the HT-SIG1 208-1, and the HT-SIG2 208-2 of the data unit 200 of FIG. 2, as defined by the IEEE 802.11n Standard. The L-SIG 206 corresponds to a first orthogonal frequency division multiplexing (OFDM) symbol, and individual tones of the first OFDM symbol are modulated using binary phase shift keying (BPSK). The HT-SIG1 208-1 corresponds to a second OFDM symbol, and the HT-SIG2 208-2 corresponds to a third OFDM symbol. Individual tones of the second OFDM symbol and the third OFDM symbol are modulated according to quaternary-BPSK (Q-BPSK). In other words, the modulation of tones of the HT-SIG1 208-1 and HT-SIG2 208-2 is rotated by 90 degrees as compared to modulation of tones of the L-SIG 206.

Figure 4:
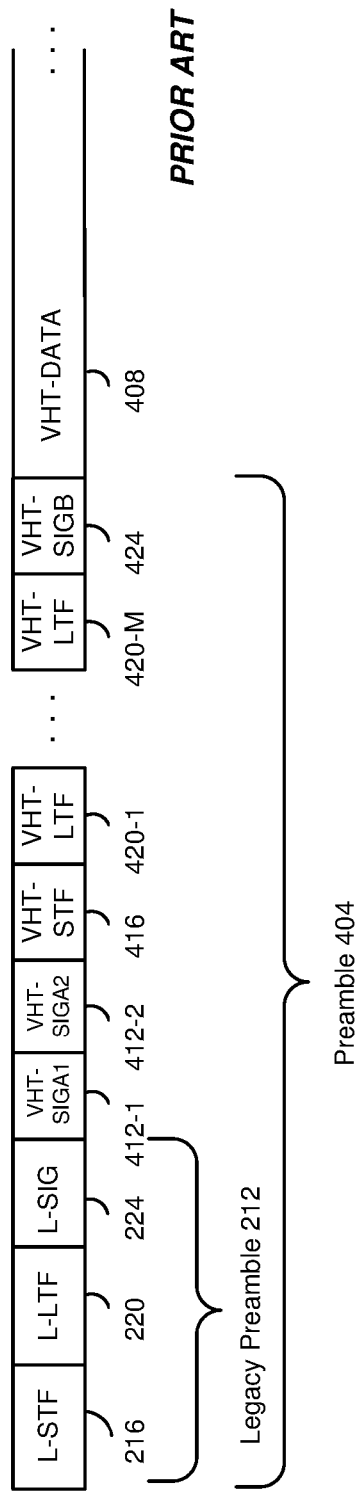
FIG. 4 is a block diagram of another prior art PHY data unit.

FIG. 4 is a diagram of a prior art PHY data unit 400 that conforms to the IEEE 802.11ac Standard.

The PHY data unit 400 includes a PHY preamble 404 preamble and a PHY data portion 408. The PHY preamble 404 includes the legacy preamble portion 212 discussed above. A communication device that conforms to the IEEE 802.11a Standard, the IEEE 802.11g Standard, and/or the IEEE 802.11n Standard (e.g., a legacy device), for example, but does not conform to the IEEE 802.11ac Standard can use the legacy preamble 212 portion to detect the PHY data unit 400 and estimate a length of the PHY data unit 400. For example, the legacy device can detect the PHY data unit 400 by detecting the L-STF 216, for example, and can estimate a duration of the PHY data unit 200 using the L-SIG 224, for example.

The preamble 404 also includes a first very high throughput signal (VHT-SIGA) field 412 (which includes a first OFDM symbol 412-1 and a second OFDM symbol 412-2), a very high throughput short training field (VHT-STF) 416, M very high throughput long training fields (VHT-LTFs) 420, where M is an integer, and a second very high throughput signal field (VHT-SIG-B) 424.

Figure 5:
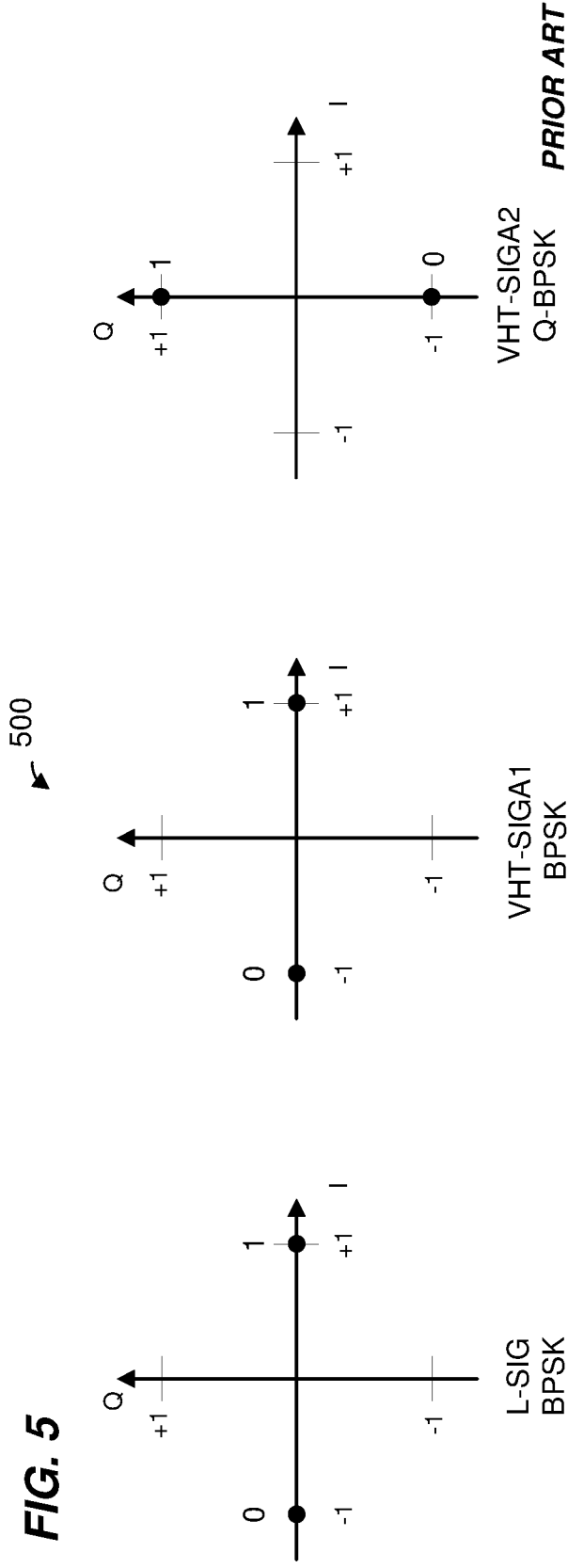
FIG. 5 is a diagram of a modulation scheme used to modulate fields in the prior art PHY data unit of FIG. 4.

FIG. 5 is a set of diagrams illustrating modulation of the L-SIG 406 and the VHT-SIGA 412, as defined by the IEEE 802.11ac Standard. Unlike the OFDM symbol 228-1 in FIG. 3, tones of the OFDM symbol 412-1 are modulated according to BPSK, which is the same as the modulation of tones of the L-SIG 224. On the other hand, tones of the OFDM symbol 412-2 are modulated using Q-BPSK, e.g., the modulation of the OFDM symbol 412-2 is rotated by 90 degrees as compared to the modulation of the L-SIG 406.

FIGS. 2-4 merely illustrate some PHY data unit formats that the AP 114 and the client station 134 are configured to generate and transmit in a WLAN 110. In other embodiments, the AP 114 and the client station 134 are configured to generate and transmit PHY data units conforming to other standards within the IEEE 802.11 Standard family and/or PHY data units conforming to one or more different communication protocols.

A communication device that receives PHY data units (e.g., data units conforming to a communication protocol within the IEEE 802.11 Standard family) may need to, in certain embodiments, distinguish between PHY data units conforming to different communication protocols (e.g., IEEE 802.11a Standard, IEEE 802.11n Standard, IEEE 802.11ac Standard, etc.) in order to appropriately process the received PHY data unit. In an embodiment, detection of a digital modulation scheme (e.g., binary phase shift keying (BPSK), quadrature binary phase shift keying (Q-BPSK), etc.), at one or more fields within a PHY preamble of the received PHY data unit, is used for distinguishing between different communication protocols at a receiver. A communication device may be configured to detect the modulation (e.g., BPSK, Q-BPSK, etc.) of one or more fields in the PHY preamble of the received PHY data unit and classify the received PHY data unit as conforming to a particular communication protocol or not conforming to a particular communication protocol.

According to an embodiment, the network interface device 142 of the client station 134 is capable of detecting and decoding PHY data units conforming to the IEEE 802.11n Standard. Thus, referring now to FIG. 2, when the network interface device 142 receives the PHY data unit 200, and the network interface device 142 detects the BPSK modulation in the L-SIG 206 and the Q-BPSK modulation in the HT-SIGs 208. Based on the detected modulation of the L-SIG 206 and the HT-SIGs 208, the network interface device 142 properly classifies the received PHY data unit 200 as conforming to an IEEE 802.11n Standard. When the network interface device 142 receives a PHY data unit and determines that an L-SIG field of the PHY preamble is modulated using BPSK, and that a field following the L-SIG field is modulated using a digital modulation scheme that is not Q-BPSK (e.g., BPSK), the network interface device 142 determines that the data unit does not conform to the IEEE 802.11n Standard.

For instance, referring now to FIG. 4, when the network interface device 142 receives the PHY data unit 400 and determines that the L-SIG 406 is BPSK modulated and a field immediately following the L-SIG 406 (i.e. VHT-SIGA1 408-1) is also BPSK modulated, the network interface device 142 determines that the PHY data unit 400 does not conform to the IEEE 802.11n Standard. Further, if the network interface device 142 is also capable of detecting and decoding data units conforming to the IEEE 802.11ac Standard, the network interface device 142 determines that a next field (i.e., VHT-SIGA2 field 408-2) is Q-BPSK modulated and classifies the PHY data unit 400 as conforming to an IEEE 802.11ac Standard.

The above examples refer to the network interface device 142 at a client station 134 utilizing detected modulation schemes at one or more fields in a received data unit to classify a received data unit as conforming to a particular communication protocol or not conforming to a particular communication protocol. While the above examples refer to PHY data units conforming to a standard within the IEEE 802.11 Standard family, in other embodiments, similar techniques can be utilized for classifying data units as conforming or not conforming to other suitable communication protocols.

Various mechanisms are used to prevent multiple communication devices from simultaneously transmitting respective data units over a same communication channel. In an embodiment, communication devices in a wireless network (e.g., WLAN 110) avoid simultaneously transmitting over a communication channel by using a clear channel assessment (CCA) technique to determine whether the channel is idle (i.e., available for data transmission) or if the communication channel is busy due to another communication device transmitting in the communication channel, in an embodiment. For instance, a communication device (e.g., the AP 114, the client station 134, etc., or a network interface device 122 in the AP 114, a network interface device 142 in the client station 134, etc.) measures a received signal energy level in the communication channel to determine whether the channel is idle. In an embodiment, the communication device, compares the received signal energy level to a threshold value and, if the received signal energy level is lower than the threshold value, determines that the communication channel is idle and available for data transmission.

On the other hand, if the received signal energy level is determined to exceed the threshold value, the communication device determines that the communication channel is busy. In an embodiment, the threshold value is set based on whether or not the received signal corresponds to a packet that conforms to a recognized communication protocol. For instance, a communication device compares a received signal energy level to a lower threshold value when it determines that the received signal corresponds to a packet that conforms to the recognized communication protocol, and compares the received signal energy level to a higher threshold value when the received signal is determined to not be a packet that conforms to the recognized communication protocol. In an embodiment, the communication device determines whether the received signal corresponds to a packet that conforms to the recognized communication protocol based on whether the communication device detects the L-STF 216 in the received signal. In an embodiment, the communication device determines whether the received signal corresponds to a packet that conforms to the recognized communication protocol further based on whether the communication device determines that received signal includes the L-SIG 224 with valid data.

The IEEE 802.11 Standard provides backward compatibility features that permit communication devices that conform to different versions of the IEEE 802.11 Standard to interoperate. For example, the PHY data units such as the PHY data unit 200 of FIG. 2 and the PHY data unit 400 of FIG. 4 include the legacy preamble 212. The legacy preamble 212 permits legacy devices to detect the PHY data unit 200/400 and estimate a duration of the PHY data unit 200/400 even though the legacy devices are not able to decode other portions of the PHY data unit 200/400. When the legacy device detects the presence and estimates the duration of the PHY data unit 200/400, the legacy device generally refrains from transmitting for the estimated duration of the PHY data unit 200/400, and thus avoids interfering with the PHY data unit 200/400.

Additionally, the IEEE 802.11 Standard helps communication devices that conform to different versions of the IEEE 802.11 Standard to interoperate by designing PHY preambles that permit detecting to which version of the protocol PHY data units conform.

For instance, a legacy device that conforms to the IEEE 802.11n Standard (and does not conform to the IEEE 802.11ac Standard) analyzes a modulation of an OFDM symbol that follows the L-SIG 224 in a received PHY data unit. If the OFDM symbol that follows the L-SIG 224 is BPSK modulated, the legacy device determines that the received PHY data unit does not conform to the IEEE 802.11n Standard. On the other hand, if the OFDM symbol that follows the L-SIG 224 is Q-BPSK modulated, the legacy device determines that the received PHY data unit does conform to the IEEE 802.11n Standard.

A device that conforms to the IEEE 802.11ac Standard also analyzes a modulation of an OFDM symbol that follows the L-SIG 224 in a received PHY data unit. If the OFDM symbol that follows the L-SIG 224 is Q-BPSK modulated, the device determines that the received PHY data unit conforms to the IEEE 802.11n Standard. On the other hand, if the OFDM symbol that follows the L-SIG 224 is BPSK modulated, the legacy device determines that the received PHY data unit does conform to the IEEE 802.11n Standard, e.g., the received PHY data may conform to the IEEE 802.11a Standard or the IEEE 802.11ac Standard. The device that conforms to the IEEE 802.11ac Standard then analyzes a modulation of a next OFDM symbol. If the next OFDM symbol is BPSK modulated, the device determines that the received PHY data unit does not conform to the IEEE 802.11ac Standard. On the other hand, if the next OFDM symbol is Q-BPSK modulated, the device determines that the received PHY data unit conforms to the IEEE 802.11ac Standard.

Figure 6:
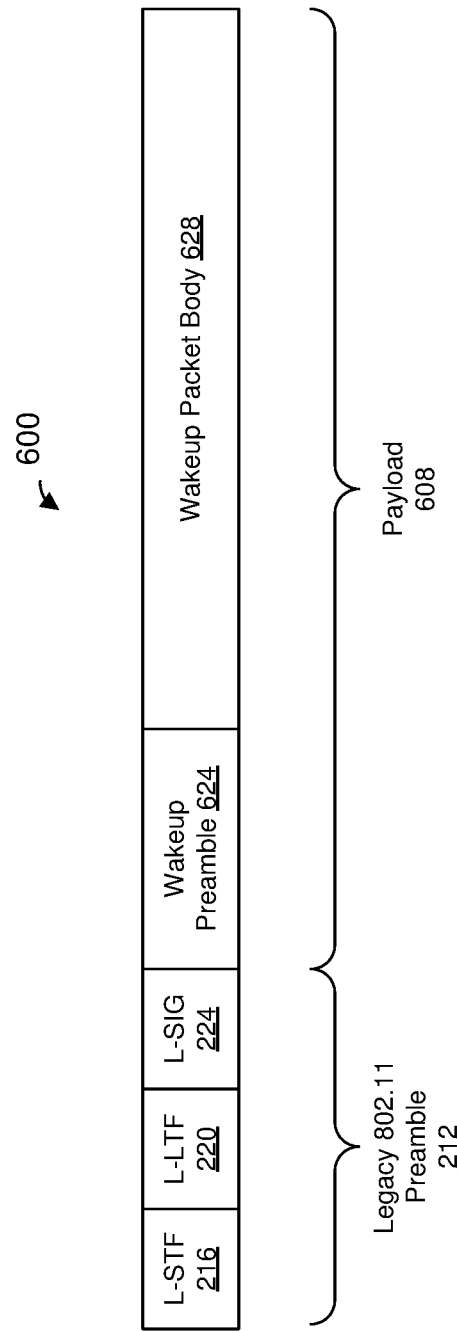
FIG. 6 is a block diagram of an example wakeup packet, according to an embodiment.

FIG. 6 is a block diagram of a wakeup packet 600 used in the example WLAN 110 of FIG. 1, according to an embodiment. The network interface device 122 of the AP 114 is configured to generate and transmit the wakeup packet 600, according to an embodiment, e.g., to prompt the network interface 142 of the client station 134 to transition from a low power state to an active state, according to an embodiment. The network interface device 142 of the client station 134-1 is also configured to generate and transmit the wakeup packet 600, e.g., to prompt the network interface 142 of another client station 134 to wake up from the low power state, according to another embodiment.

The wakeup packet 600 includes the legacy 802.11 preamble 212 (discussed above) and a payload 608. The legacy 802.11 preamble 212 enables IEEE 802.11 stations (e.g., wireless communication devices that are configured to operate according to an IEEE 802.11 Standard) to detect the wakeup packet 600 and estimate a duration of the wakeup packet 600 for the purpose of reducing transmissions by the IEEE 802.11 stations that will collide with the wakeup packet 600, according to an embodiment.

In other embodiments, the wakeup packet 600 includes a legacy preamble (different than the legacy 802.11 preamble 212) that enables stations that conform to a different suitable wireless communication protocol (e.g., other than the IEEE 802.11 Standard) to detect the wakeup packet 600 and estimate a duration of the wakeup packet 600 for the purpose of reducing transmissions by such stations that will collide with the wakeup packet 600, according to an embodiment.

The payload 608 includes a wakeup preamble 624 and a wakeup packet body 628. In an embodiment, the wakeup preamble 624 includes signals that enable LP-WURs such as the LP-WUR 150 to detect the payload 608 of the wakeup packet 620 and to synchronize to the payload 608 of the wakeup packet 620. In an embodiment, the wakeup packet body 628 includes a network address (e.g., a MAC address, an AID, or another suitable network address) corresponding to a client station (or a group of client stations) for which the wakeup packet 600 is intended. Referring now to FIG. 1D, the digital baseband circuitry 188 is configured to detect the wakeup packet 600 at least by detecting the wakeup preamble 624, according to an embodiment. The logic circuitry 192 is configured to process the wakeup packet body 628 to determine whether the wakeup packet body 628 includes a network address (e.g., a MAC address, an AID, or another suitable network address) corresponding to the client station 134-1.

In an embodiment, the wakeup packet 600 is generated and transmitted (by network interface device 122 of the AP 114, etc.) using orthogonal frequency domain multiplexing (OFDM) modulation. In one such embodiment, each of the fields of the wakeup packet 600 corresponds to one or more OFDM symbols. For example, the L-SIG 224 corresponds to one OFDM symbol.

In an embodiment, network interface devices (such as the network interface device 142) of client stations are configured to receive, detect, and decode at least the legacy 802.11 preamble 212 of the wakeup packet 600. In an embodiment, the legacy 802.11 preamble 212 is detected and decoded at i) wireless network interface devices of communication devices that do not include a LP-WUR, and/or ii) at wireless network interface devices of communication devices that include a LP-WUR and whose wireless network interface devices have already transitioned to an active state from a low power state (based on a prior wakeup packet, for example).

In an embodiment, the payload 608 of the wakeup packet 200 does not conform to a communication protocol that can be decoded and processed by a wireless network interface device such as the network interface device 142. In one such embodiment, the network interface device 142 is not configured to (or fails to) decode and process at least a portion of the wakeup preamble 624 and the wakeup packet body 628 of the wakeup packet 600.

The LP-WUR 150 of the client station 134-1 is not capable of detecting and/or decoding the payload legacy preamble 212 of the wakeup packet 600, according to an embodiment. In other embodiments, however, the LP-WUR 150 of the client station 134-1 is configured to additionally receive, detect, and decode the legacy 802.11 preamble 212, or a portion thereof.

The payload 608 corresponds to a PPDU defined by a communication protocol (sometime referred to herein as a "wakeup packet communication protocol") which is different than the communication protocol according to which the network interface device 142 is configured to operate (sometime referred to herein as a "WiFi communication protocol"), according to an embodiment. In an embodiment, the LP-WUR 150 cannot process and/or cannot correctly decode the legacy 802.11 preamble 212 (or at least a portion thereof), and the network interface device 142 cannot process and/or cannot correctly decode the payload 608 (or at least a portion thereof).

In an embodiment, the payload 608 of the wakeup packet 600 occupies a smaller bandwidth (e.g., less than 50%, less than 25%, less than 20%, less than 10%) than the bandwidth of the legacy 802.11 preamble 212. For instance, in an embodiment, the legacy preamble 212 spans a 20 MHz bandwidth and the payload 608 spans 4 MHz. In an embodiment, the wakeup packet 600 is generated and transmitted (by network interface device 122 of the AP 114, network interface device 142 of the client station 134, etc.) using OFDM and the legacy 802.11 preamble 212 is transmitted using a number of subcarriers that is greater than a number of subcarriers used for transmission of the payload 608. For instance, in an embodiment, the legacy 802.11 preamble 212 is transmitted over 52 subcarriers within a 20 MHz wide communication channel, whereas the payload 608 is transmitted over 13 subcarriers that span only a portion (e.g., a center 4 MHz portion) of the wider 20 MHz communication channel. In an embodiment, during the transmission of the payload 608, the remaining subcarriers corresponding to the wider 20 MHz communication channel are not used for transmission of any data and, therefore, do not include any transmitted signals.

A lower occupied bandwidth of a payload 608 of the wakeup packet 600 may lead to spurious detection of a communication protocol at a legacy wireless network interface device such as a wireless network interface device that is configured to i) operate according to the IEEE 802.11n Standard and ii) is not configured to operated according to the IEEE 802.11ac Standard (hereinafter referred to as a "legacy 11n wireless network interface device"). For instance, as described above with respect to the wakeup packet 600, the payload 608 is transmitted over a narrower communication channel (e.g., over a lower number of subcarriers) as compared to the legacy 802.11 preamble 212 that is transmitted over the wider 20 MHz communication channel. However, a legacy 11n wireless network interface device is configured to operate over the entirety of the wider communication channel. As a result, the legacy 11n wireless network interface device may improperly detect the modulation of an OFDM symbol in the payload 608 that follows the L-SIG 224. As merely an example, following the reception of the L-SIG 224, the legacy 11n wireless network interface device will continue to process signals over the entirety of 20 MHz communication channel, including ambient noise over subcarriers that do not include any data. The legacy 11n wireless network interface then attempts to determine a modulation of the OFDM symbol that follows the L-SIG 224 in order to determine the communication protocol corresponding to the received wakeup packet 600. Ambient noise that is received along with the payload 608 may lead to incorrect detection of the communication protocol at the legacy 11n network interface device.

In an embodiment, based on the detected modulations of L-SIG 224 and the OFDM symbol that immediately follows the L-SIG 224 (including the ambient noise), the legacy 11n network interface device may sometimes incorrectly classify the wakeup packet 600 as conforming to the IEEE 802.11n Standard. However, since the payload 608 of the wakeup packet 600 does not conform to the IEEE 802.11 Standard, the legacy 11n network interface device will likely detect an error in data that the legacy 11n network interface device decodes.

For instance, in an embodiment, the legacy 11n network interface device may incorrectly detect a modulation of the OFDM symbol that immediately follows the L-SIG 224 as Q-BPSK, and thus classify the wakeup packet 600 as conforming to the IEEE 802.11n Standard. The legacy 11n network interface device will then assume that the two OFDM symbols that follow the L-SIG 224 corresponds to the HT-SIG field 208 (FIG. 2), and thus processes the two OFDM symbols that follow the L-SIG 224 accordingly. The legacy 11n network interface device will then likely detect a cyclic redundancy check (CRC) error in the data decoded from the two OFDM symbols (which the legacy 11n network interface device assumes are the HT-SIG field 208 (FIG. 2)) that follow the L-SIG 224. In response to the detected CRC error, the network interface device 142 stops receiving and processing the PHY data unit 600 and determines whether the communication channel should be considered as idle before an end of the duration of the PHY data unit 600.

For example, the IEEE 802.11n Standard specifies that if a CRC error is detected in the HT-SIG field 228, the legacy 11n network interface device should monitor the received signal energy level and compares the received signal energy level to a threshold. If the received signal energy level falls below the threshold, the IEEE 802.11n Standard specifies that the legacy 11n network interface device should consider the communication channel as being idle, even before the duration of the packet has ended. Because the payload 608 of the wakeup packet 600 does not span the entire 20 MHz channel, there is a likelihood that the legacy 11n network interface device will detect the received signal energy level as falling below the threshold during reception of the payload 608. Thus, there is a likelihood that, when the legacy 11n network interface device receives the wakeup packet 600, the legacy 11n network interface device will determine that the communication channel is idle prior to an end of the wakeup packet 600, and may thus initiate transmission of a legacy 11n packet during transmission of the wakeup packet 600. Such a transmission of a legacy 11n packet during transmission of the wakeup packet 600 may collide with the wakeup packet 600 and interfere with the ability of LP-WURs to detect and/or correctly process the wakeup packet 600.

To reduce the chance of a legacy 11n network interface device incorrectly classifying the wakeup packet 600 as conforming to the IEEE 802.11n Standard, an additional field may be included between the legacy 802.11 preamble 212 and the wakeup preamble 624. In an embodiment, the presence of this additional field "spoofs" a recipient legacy 11n network interface device into classifying the wakeup packet as not conforming to the IEEE 802.11n Standard.

Figure 7:
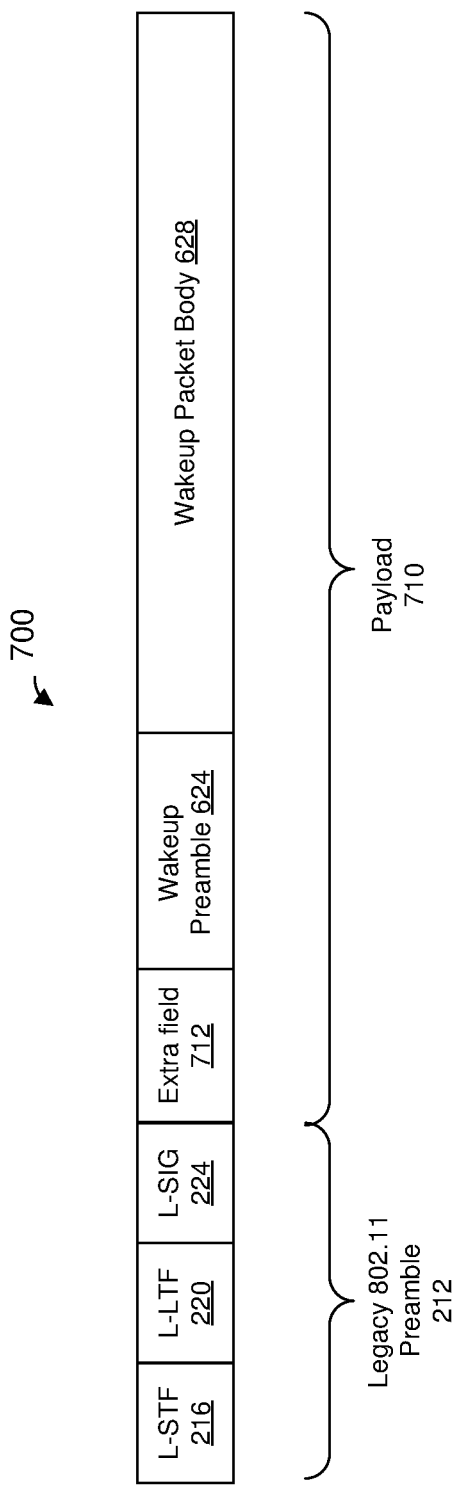
FIG. 7 is a block diagram of another example wakeup packet, according to another embodiment.

FIG. 7 is a diagram of an example wakeup packet 700 used in the example WLAN 110 of FIG. 1, according to an embodiment. The network interface device 122 of the AP 114 is configured to generate and transmit the wakeup packet 700, according to an embodiment. The network interface device 142 of the client station 134-1 is also configured to generate and transmit the wakeup packet 700, e.g., to prompt another client station 134 to wake up from a low power state, according to another embodiment. The wakeup packet 700 is similar to the wakeup packet 600 and like-numbered elements are not discussed for reasons of brevity.

Figure 8:
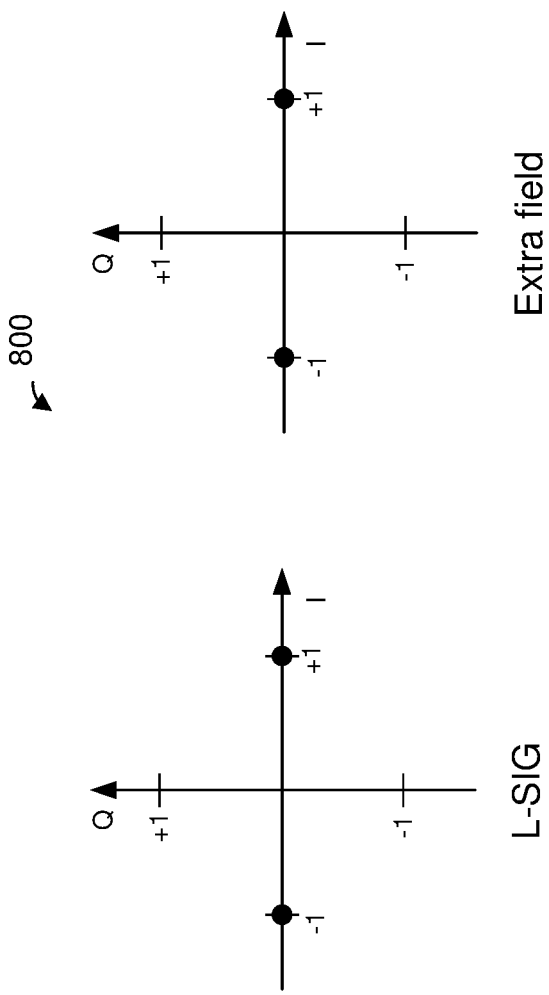
FIG. 8 is a diagram of a modulation scheme used to modulate fields in the example wakeup packet of FIG. 7, according to an embodiment.

A payload 710 of the of the wakeup packet 700 includes an extra field 712 immediately following the legacy preamble 212 and occupying a bandwidth that is equal to the bandwidth of the legacy preamble 212. For instance, in an embodiment, the legacy preamble 212 is transmitted to span a 20 MHz communication channel and the extra field 712 is also transmitted to span the same 20 MHz communication channel. In an embodiment, the extra field 712 is modulated using a digital modulation technique that is different from Q-BPSK. For instance, as shown in FIG. 8, the L-SIG 224 and the extra field 712 are both modulated using BPSK.

In an embodiment, the extra field 712 is a repeated L-SIG 224. In an embodiment, the extra field 712 is identical to at least a portion of the L-LTF 220. In other embodiments, the extra field 712 includes any other suitable signal and/or information. In an embodiment, the extra field 172 does not convey any useful information to recipient communication devices. In another embodiment, the extra field 172 does convey useful information to recipient communication devices. For example, in an embodiment, wakeup packet data (e.g., which includes a network address corresponding to an intended client station or stations) is encoded within/on a set of OFDM symbols that includes the extra field 172 and the wakeup packet body 628.

In an embodiment, bits in the extra field 712 are scrambled. For instance, in an embodiment, the bits of the extra field 712 are scrambled using a scrambling technique that conforms to a standard within the IEEE 802.11 Standard family (e.g. IEEE 802.11a Standard, IEEE 802.11n Standard, etc.). In another embodiment, a different scrambling technique is utilized for the bits in the extra field 712.

A legacy 11n network interface device that receives the wakeup packet 700 detects the L-SIG 224 as being BPSK modulated. Following this, the legacy 11n network interface device detects the extra field 712 as being modulated using a digital modulation technique that is different from Q-BPSK and therefore classifies the wakeup packet 700 as not conforming to an IEEE 802.11n Standard. For example, the legacy 11n network interface device may assume that the wakeup packet 700 conforms to the IEEE 802.11a Standard. When the network interface device 142 detects a CRC error in an attempt to decode and process the payload 710 of the wakeup packet 700, the network interface device 142 stops processing the wakeup packet 700 and considers the communication channel as busy until an estimated duration (determined using the L-SIG 224) of the wakeup packet 700 has ended. Thus, the legacy 11n network interface device will not initiate a transmission during the transmission of the wakeup packet 700.

The presence of the extra field 712 with a defined modulation and that spans a same wider communication channel as the legacy 802.11 preamble 604 enables the legacy 11n network interface device to unambiguously classify the wakeup packet 700 as not conforming to the IEEE 802.11n Standard, according to an embodiment.

In an embodiment, the wakeup packet 700 is generated and transmitted by network interface device 122 of the AP 114, the network interface device 142 of the client station 134, etc., using OFDM modulation. In one such embodiment, each of the fields of the wakeup packet 700 correspond to one or more OFDM symbols. In an embodiment, for example, the L-SIG 224 corresponds to one OFDM symbol and the extra field 712 corresponds to another OFDM symbol.

In an embodiment, the LP-WUR 150 of the client station 134-1 is configured to receive, detect, and decode only the wakeup preamble 624 and the wakeup packet body 628 of the wakeup packet 700, according to an embodiment. In other embodiments, however, the LP-WUR 150 of the client station 134-1 is configured to additionally receive, detect, and decode the extra field 712.

In an embodiment, where the LP-WUR 150 is configured to decode the extra field 712, the LP-WUR 150 operates over the entire bandwidth of the 20 MHz communication channel. For instance, in an embodiment, the LP-WUR 150 is configured to receive signals that span the entire 20 MHz communication channel that is used to transmit the extra field 712. In one such embodiment, the extra field 712 further includes signals that enable the LP-WUR 150 to perform receiver gain adjustment and/or synchronization. In an embodiment where the extra field 712 includes signals for receiver gain adjustment and/or synchronization, a duration of the wakeup preamble 624 may be shortened as compared to the wakeup packet 600 (FIG. 6) that does not include the extra field 712.

While the wakeup packet 700 has been described in the context of the IEEE 802.11 Standard family, in other embodiments, a similar technique is used to "spoof" communication devices in networks utilizing other communication protocols. For instance, one or more extra fields with particular modulation schemes may be inserted into a packet that "spoofs" a receiving communication device into classifying the packet as not conforming to a communication protocol that has disadvantageous characteristics (e.g., that may lead to an inadvertent determination that a communication channel is idle during transmission of a packet).

Figure 9:
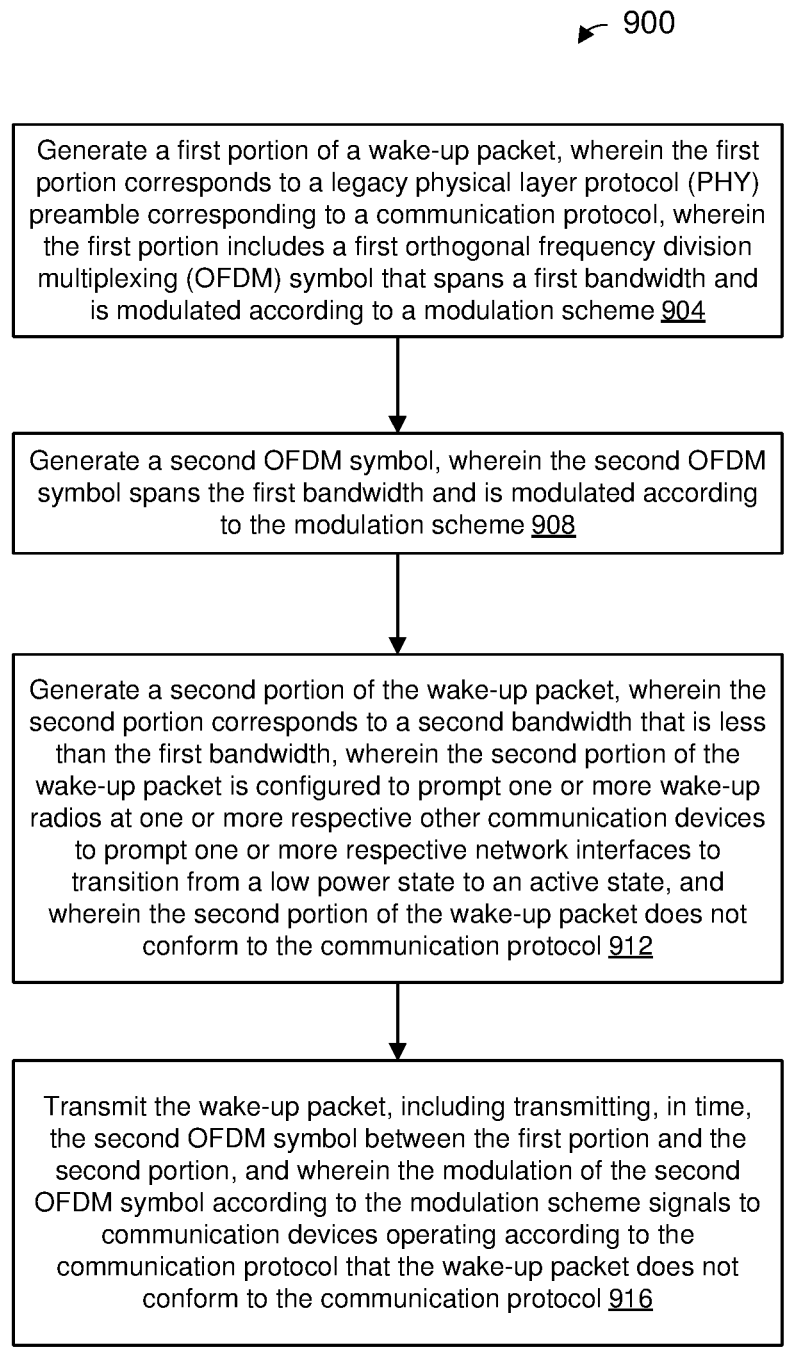
FIG. 9 is a flow diagram of an example method for generating wakeup packets, according to an embodiment.

FIG. 9 is a flow diagram of an example method 900 for generating wakeup packets, according to an embodiment. In some embodiments, the network interface device 122 of FIG. 1 is configured to implement the method 900. The method 900 is described, however, in the context of the network interface device 122 merely for explanatory purposes and, in other embodiments, the method 900 is implemented by another suitable device, such as the network interface device 142.

At block 904, the network interface device 122 generates a first portion of a wakeup packet. The first portion corresponds to a legacy PHY preamble corresponding to a communication protocol. The first portion includes a first OFDM symbol that spans a first bandwidth and is modulated according to a modulation scheme. In an embodiment, the legacy PHY preamble is a legacy 802.11 preamble corresponding to the protocol specified by the IEEE 802.11n Standard. The legacy PHY preamble corresponds to other communication protocols as well, such as the protocol specified by the IEEE 802.11ac Standard, the protocol specified by the IEEE 802.11ax Standard (now under development), etc., in some embodiments.

At block 908, the network interface device 122 generates a second OFDM symbol, wherein the second OFDM symbol spans the first bandwidth and is modulated according to the modulation scheme. In an embodiment, the second OFDM symbol corresponds to an extra symbol that follows legacy PHY preamble, such as the extra symbol 712 as described above with reference to FIG. 7. The second OFDM symbol is also modulated according to the BPSK modulation scheme, in an embodiment.

At block 912, the network interface device 122 generates a second portion of the wakeup packet. The second portion spans a second bandwidth that is less than the first bandwidth. The second portion of the wakeup packet is configured to prompt one or more wakeup radios at one or more respective communication devices to prompt one or more respective network interfaces to transition from a low power state to an active state. The second portion of the wakeup packet does not conform to the communication protocol to which the legacy PHY preamble conforms. In an embodiment, the second portion of the wakeup packet corresponds to the wakeup preamble 624 and wakeup packet body 628 of the wakeup packet 700 as described above. In an embodiment, the second portion of the wakeup packet is not configured to be decoded and processed by a network interface device that can decode and process data units conforming to a standard within the IEEE 802.11 Standard family.

At block 916, the network interface device 122 transmits the wakeup packet. The transmitted wakeup packet includes the second OFDM symbol that is transmitted, in time, between the first portion and the second portion of the wakeup packet. The modulation of the second OFDM symbol according to the modulation scheme signals to communication devices operating according to the communication protocol that the wakeup packet does not conform to the communication protocol. For instance, modulation of both the L-SIG and modulation of the second OFDM symbol following L-SIG according to a BPSK modulation scheme signals to a legacy 11n network interface device that the wakeup packet does not conform to the IEEE 802.11n Standard.

Although the techniques described above were discussed in the context of wakeup packets that can be decoded by LP-WURs, similar techniques can be utilized in other types of wireless communication systems that may coexist with IEEE 802.11n/ac/ax wireless networks having legacy 11n wireless network interface device, in other embodiments. For example, other narrow band wireless communication networks in the 2.4 GHz and 5 GHz bands may utilize a packet structure similar to those discussed above so that legacy 802.11n network interface devices unambiguously classify such packets as not conforming to the IEEE 802.11n Standard, according to other embodiments.

Embodiment 1

A method, comprising: generating, at the first communication device, a first portion of a wakeup packet, wherein the first portion of the wakeup packet corresponds to a legacy physical layer protocol (PHY) preamble corresponding to a communication protocol, wherein the first portion of the wakeup packet includes a first orthogonal frequency division multiplexing (OFDM) symbol that spans a first bandwidth and is modulated according to a modulation scheme; generating, at the first communication device, a second OFDM symbol, wherein the second OFDM symbol spans the first bandwidth and is modulated according to the modulation scheme; generating, at the first communication device, a second portion of the wakeup packet, wherein the second portion of the wakeup packet corresponds to a second bandwidth that is less than the first bandwidth, wherein the second portion of the wakeup packet is configured to prompt one or more wakeup radios at one or more respective second communication devices to prompt one or more respective network interfaces to transition from a low power state to an active state, and wherein the second portion of the wakeup packet does not conform to the communication protocol; and transmitting, by the first communication device, the wakeup packet, including transmitting, in time, the second OFDM symbol between the first portion of the wakeup packet and the second portion of the wakeup packet, and wherein the modulation of the second OFDM symbol according to the modulation scheme signals to third communication devices operating according to the communication protocol that the wakeup packet does not conform to the communication protocol.

Embodiment 2

The method of Embodiment 1, wherein the first OFDM symbol corresponds to a legacy signal (L-SIG) field that includes information indicating a duration of the wakeup packet.

Embodiment 3

The method of Embodiment 2, wherein the second OFDM symbol is a repetition of the first OFDM symbol.

Embodiment 4

The method of any of Embodiments 1-3, wherein: the first portion of the wakeup packet includes a third OFDM symbol corresponding to a legacy long training field (L-LTF), and the second OFDM symbol is a repetition of the third OFDM symbol.

Embodiment 5

The method of Embodiment 1, wherein the second OFDM symbol of the wakeup packet does not convey any useful information to the one or more second communication devices.

Embodiment 6

The method of Embodiment 1, wherein the second OFDM symbol includes a plurality of information bits intended for the one or more second communication devices.

Embodiment 7

The method of Embodiment 6, further comprising scrambling the plurality of information bits.

Embodiment 8

The method of any of Embodiments 1-7, wherein the second portion of the wakeup packet includes at least a portion of a network identifier corresponding to the one or more second communication devices.

Embodiment 9

The method of Embodiment 8, wherein the network identifier is a multicast address corresponding to the one or more second communication devices.

Embodiment 10

The method of any of Embodiments 1-7, wherein the second portion of the wakeup packet includes at least a portion of a network identifier corresponding to a broadcast address.

Embodiment 11

The method of Embodiment 1, wherein generating the second OFDM symbol includes generating the second OFDM symbol to include signals that enable the one or more low power wakeup radios at the respective one or more second communication devices to perform at least one of i) receiver gain adjustment, and ii) synchronization.

Embodiment 12

The method of any of Embodiments 1-11, wherein the first OFDM symbol and the second OFDM symbol are modulated according to a binary phase shift keying (BPSK) modulation scheme.

Embodiment 13

An apparatus, comprising: a network interface device associated with a first communication device, wherein the network interface device includes one or more integrated circuits (ICs) configured to: generate a first portion of a wakeup packet, wherein the first portion of the wakeup packet corresponds to a legacy physical layer protocol (PHY) preamble corresponding to a communication protocol, wherein the first portion of the wakeup packet includes a first orthogonal frequency division multiplexing (OFDM) symbol that spans a first bandwidth and is modulated according to a modulation scheme, generate a second OFDM symbol, wherein the second OFDM symbol spans the first bandwidth and is modulated according to the modulation scheme, generate a second portion of the wakeup packet, wherein the second portion of the wakeup packet corresponds to a second bandwidth that is less than the first bandwidth, wherein the second portion of the wakeup packet is configured to prompt one or more wakeup radios at one or more respective second communication devices to prompt one or more respective network interfaces to transition from a low power state to an active state, and wherein the second portion of the wakeup packet does not conform to the communication protocol, and transmit the wakeup packet, including transmitting, in time, the second OFDM symbol between the first portion of the wakeup packet and the second portion of the wakeup packet, and wherein the modulation of the second OFDM symbol according to the modulation scheme signals to third communication devices operating according to the communication protocol that the wakeup packet does not conform to the communication protocol.

Embodiment 14

The apparatus of Embodiment 13, wherein the first OFDM symbol corresponds to a legacy signal (L-SIG) field that includes information indicating a duration of the wakeup packet.

Embodiment 15

The apparatus of Embodiment 14, wherein the one or more ICs are configured to generate the second OFDM symbol as a repetition of the first OFDM symbol.

Embodiment 16

The apparatus of any of Embodiments 13-15, wherein the one or more ICs are configured to: generate the first portion of the wakeup packet to include a third OFDM symbol corresponding to a legacy long training field (L-LTF), and generate the second OFDM symbol as a repetition of the third OFDM symbol.

Embodiment 17

The apparatus of Embodiment 13, wherein the second OFDM symbol of the wakeup packet does not convey any useful information to the one or more second communication devices.

Embodiment 18

The apparatus of Embodiment 13, wherein the second OFDM symbol includes a plurality of information bits intended for the one or more second communication devices.

Embodiment 19

The apparatus of Embodiment 18, wherein the one or more ICs are configured to scramble the plurality of information bits.

Embodiment 20

The apparatus of any of Embodiments 13-19, wherein the one or more ICs are configured to generate the second portion of the wakeup packet to include at least a portion of a network identifier corresponding to the one or more second communication devices.

Embodiment 21

The apparatus of Embodiment 20, wherein the network identifier is a multicast address corresponding to the one or more second communication devices.

Embodiment 22

The apparatus of claim any of Embodiments 13-19, wherein the one or more ICs are configured to generate the second portion of the wakeup packet to include at least a portion of a network identifier corresponding to a broadcast address.

Embodiment 23

The apparatus of Embodiment 13, wherein the one or more ICs are further configured to generate the second OFDM symbol to include signals that enable the one or more low power wakeup radios at the respective one or more second communication devices to perform at least one of i) receiver gain adjustment, and ii) synchronization.

Embodiment 24

The apparatus of any of Embodiments 13-23, wherein the one or more ICs are configured to modulate the first OFDM symbol and the second OFDM symbol according to a binary phase shift keying (BPSK) modulation scheme.

Embodiment 25

A method, comprising: generating, at the first communication device, a first portion of a packet intended for one or more second communication devices, wherein the first portion of the packet corresponds to a legacy physical layer protocol (PHY) preamble corresponding to a first communication protocol, wherein the first portion of the packet includes a first orthogonal frequency division multiplexing (OFDM) symbol that spans a first bandwidth and is modulated according to a modulation scheme; generating, at the first communication device, a second OFDM symbol, wherein the second OFDM symbol spans the first bandwidth and is modulated according to the modulation scheme; generating, at the first communication device, a second portion of the packet, wherein the second portion of the packet conforms to a second communication protocol configured for communications on one or more channel bandwidths that are narrower than the first bandwidth, wherein the second portion of the packet corresponds to a second bandwidth that is less than the first bandwidth, and wherein the second portion of the packet does not conform to the first communication protocol; and transmitting, by the first communication device, the packet, including transmitting, in time, the second OFDM symbol between the first portion of the packet and the second portion of the packet, and wherein the modulation of the second OFDM symbol according to the modulation scheme signals to third communication devices operating according to the first communication protocol that the packet does not conform to the first communication protocol.

Embodiment 26

The method of Embodiment 25, wherein the first OFDM symbol corresponds to a legacy signal (L-SIG) field that includes information indicating a duration of the packet.

Embodiment 27

The method of Embodiment 26, wherein the second OFDM symbol is a repetition of the first OFDM symbol.

Embodiment 28

The method of any of Embodiments 25-27, wherein: the first portion of the packet includes a third OFDM symbol corresponding to a legacy long training field (L-LTF), and the second OFDM symbol is a repetition of the third OFDM symbol.

Embodiment 29

The method of Embodiment 25, wherein the second OFDM symbol of the packet does not convey any useful information to the one or more second communication devices.

Embodiment 30

The method of Embodiment 25, wherein the second OFDM symbol includes a plurality of information bits intended for the one or more second communication devices.

Embodiment 31

The method of Embodiment 30, further comprising scrambling the plurality of information bits.

Embodiment 32

The method of any of Embodiments 25-31, wherein the second portion of the packet includes at least a portion of a network identifier corresponding to the one or more second communication devices.

Embodiment 33

The method of Embodiment 32, wherein the network identifier is a multicast address corresponding to the one or more second communication devices.

Embodiment 34

The method of any of Embodiments 25-31, wherein the second portion of the packet includes at least a portion of a network identifier corresponding to a broadcast address.

Embodiment 35

The method of Embodiment 25, wherein generating the second OFDM symbol includes generating the second OFDM symbol to include signals that enable one or more network interfaces at the respective one or more second communication devices to perform at least one of i) receiver gain adjustment, and ii) synchronization.

Embodiment 36

The method of any of Embodiments 25-35, wherein the first OFDM symbol and the second OFDM symbol are modulated according to a binary phase shift keying (BPSK) modulation scheme.

Embodiment 37

An apparatus, comprising: a network interface device associated with a first communication device. The network interface device includes one or more integrated circuits (ICs) configured to: generate a first portion of a packet intended for one or more second communication devices, wherein the first portion of the packet corresponds to a legacy physical layer protocol (PHY) preamble corresponding to a first communication protocol, wherein the first portion of the packet includes a first orthogonal frequency division multiplexing (OFDM) symbol that spans a first bandwidth and is modulated according to a modulation scheme; generate a second OFDM symbol, wherein the second OFDM symbol spans the first bandwidth and is modulated according to the modulation scheme; generate a second portion of the packet, wherein the second portion of the packet conforms to a second communication protocol configured for communications on one or more channel bandwidths that are narrower than the first bandwidth, wherein the second portion of the packet corresponds to a second bandwidth that is less than the first bandwidth, and wherein the second portion of the packet does not conform to the first communication protocol; and transmit the packet, including transmitting, in time, the second OFDM symbol between the first portion of the packet and the second portion of the packet, and wherein the modulation of the second OFDM symbol according to the modulation scheme signals to third communication devices operating according to the first communication protocol that the packet does not conform to the first communication protocol.

Embodiment 38

The apparatus of Embodiment 37, wherein the first OFDM symbol corresponds to a legacy signal (L-SIG) field that includes information indicating a duration of the packet.

Embodiment 39

The apparatus of Embodiment 38, wherein the one or more ICs are configured to generate the second OFDM symbol as a repetition of the first OFDM symbol.

Embodiment 40

The apparatus of any of Embodiments 37-39, wherein the one or more ICs are configured to: generate the first portion of the packet to include a third OFDM symbol corresponding to a legacy long training field (L-LTF), and generate the second OFDM symbol as a repetition of the third OFDM symbol.

Embodiment 41

The apparatus of Embodiment 37, wherein the second OFDM symbol of the packet does not convey any useful information to the one or more second communication devices.

Embodiment 42

The apparatus of Embodiment 37, wherein the second OFDM symbol includes a plurality of information bits intended for the one or more second communication devices.

Embodiment 43

The apparatus of Embodiment 42, wherein the one or more ICs are configured to scramble the plurality of information bits.

Embodiment 44

The apparatus of any of Embodiments 37-43, wherein the one or more ICs are configured to generate the second portion of the packet to include at least a portion of a network identifier corresponding to the one or more second communication devices.

Embodiment 45

The apparatus of Embodiment 44, wherein the network identifier is a multicast address corresponding to the one or more second communication devices.

Embodiment 46

The apparatus of claim any of Embodiments 37-43, wherein the one or more ICs are configured to generate the second portion of the packet to include at least a portion of a network identifier corresponding to a broadcast address.

Embodiment 47

The apparatus of Embodiment 13, wherein the one or more ICs are further configured to generate the second OFDM symbol to include signals that enable one or more network interface devices at the respective one or more second communication devices to perform at least one of i) receiver gain adjustment, and ii) synchronization.

Embodiment 24

The apparatus of any of Embodiments 37-47, wherein the one or more ICs are configured to modulate the first OFDM symbol and the second OFDM symbol according to a binary phase shift keying (BPSK) modulation scheme.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
generating, at a first communication device, a first portion of a wakeup packet, wherein the first portion of the wakeup packet corresponds to a legacy physical layer protocol (PHY) preamble corresponding to a communication protocol, wherein the first portion of the wakeup packet includes a first orthogonal frequency division multiplexing (OFDM) symbol that spans a first bandwidth and is modulated according to a modulation scheme;
scrambling, at the first communication device, a plurality of information bits to generate scrambled information bits to be included in a second OFDM symbol that spans the first bandwidth of the legacy PHY preamble, the plurality of information bits intended for the one or more second communication devices;
generating, at the first communication device, the second OFDM symbol to include the scrambled information bits, wherein the second OFDM symbol spans the first bandwidth and is modulated according to the modulation scheme to indicate that the wakeup packet does not conform to the communication protocol;
generating, at the first communication device, a second portion of the wakeup packet, wherein the second portion of the wakeup packet corresponds to a second bandwidth that is less than the first bandwidth, and wherein the second portion of the wakeup packet does not conform to the communication protocol; and
transmitting, by the first communication device, the wakeup packet, including transmitting, in time, the second OFDM symbol between the first portion of the wakeup packet and the second portion of the wakeup packet, and wherein the modulation of the second OFDM symbol according to the modulation scheme signals to third communication devices operating according to the communication protocol that the wakeup packet does not conform to the communication protocol.

2. The method of claim 1, wherein:
the first OFDM symbol corresponds to a legacy signal (L-SIG) field that includes information indicating a duration of the wakeup packet; and
scrambling the plurality of information bits to generate scrambled information bits comprises scrambling information bits of the L-SIG field.

3. The method of claim 1, wherein:
scrambling the plurality of information bits to generate scrambled information bits comprises using a scrambling technique defined by IEEE 802.11 Standard.

4. The method of claim 1, wherein:
generating the first portion of the wakeup packet comprises generating the first portion of the wakeup packet to include a third OFDM symbol corresponding to a legacy long training field (L-LTF); and
transmitting the wakeup packet comprises transmitting, in time, the third OFDM symbol prior to the first OFDM symbol.

5. The method of claim 1, wherein the second portion of the wakeup packet includes at least a portion of a network identifier corresponding to the one or more second communication devices.

6. The method of claim 5, wherein the network identifier is a multicast address corresponding to the one or more second communication devices.

7. The method of claim 1, wherein the second portion of the wakeup packet includes at least a portion of a network identifier corresponding to a broadcast address.

8. The method of claim 1, wherein generating the second OFDM symbol includes generating the second OFDM symbol to include signals that enable the one or more low power wakeup radios at the respective one or more second communication devices to perform at least one of i) receiver gain adjustment, and ii) synchronization.

9. The method of claim 1, wherein:
generating the first portion of the wakeup packet comprises generating the first OFDM symbol according to a binary phase shift keying (BPSK) modulation scheme; and
generating the second OFDM symbol comprises generating the second OFDM symbol according to the BPSK modulation scheme.

10. A first communication device, comprising:
a wireless network interface device having one or more integrated circuit (IC) devices configured to:
generate a first portion of a wakeup packet, wherein the first portion of the wakeup packet corresponds to a legacy physical layer protocol (PHY) preamble corresponding to a communication protocol, wherein the first portion of the wakeup packet includes a first orthogonal frequency division multiplexing (OFDM) symbol that spans a first bandwidth and is modulated according to a modulation scheme,
scramble a plurality of information bits to generate scrambled information bits to be included in a second OFDM symbol that spans the first bandwidth of the legacy PHY preamble, the plurality of information bits intended for the one or more second communication devices, generate the second OFDM symbol to include the scrambled information bits, wherein the second OFDM symbol spans the first bandwidth, and is modulated according to the modulation scheme to indicate that the wakeup packet does not conform to the communication protocol, generate a second portion of the wakeup packet, wherein the second portion of the wakeup packet corresponds to a second bandwidth that is less than the first bandwidth, and wherein the second portion of the wakeup packet does not conform to the communication protocol, and control the wireless network interface device to transmit the wakeup packet, including transmitting, in time, the second OFDM symbol between the first portion of the wakeup packet and the second portion of the wakeup packet, and wherein the modulation of the second OFDM symbol according to the modulation scheme signals to third communication devices operating according to the communication protocol that the wakeup packet does not conform to the communication protocol.

11. The first communication device of claim 10, wherein:
the first OFDM symbol corresponds to a legacy signal (L-SIG) field that includes information indicating a duration of the wakeup packet; and
the one or more IC devices are configured to scramble information bits of the L-SIG field to generate the scrambled information bits.

12. The first communication device of claim 10, wherein the one or more IC devices are configured to:
scramble the plurality of information bits to generate scrambled information bits using a scrambling technique defined by IEEE 802.11 Standard.

13. The first communication device of claim 10, wherein the one or more IC devices are configured to:
generate the first portion of the wakeup packet to include a third OFDM symbol corresponding to a legacy long training field (L-LTF); and control the wireless network interface device to transmit, in time, the third OFDM symbol prior to the first OFDM symbol.

14. The first communication device of claim 10, wherein the one or more IC devices are configured to generate the second portion of the wakeup packet to include at least a portion of a network identifier corresponding to the one or more second communication devices.

15. The first communication device of claim 14, wherein the network identifier is a multicast address corresponding to the one or more second communication devices.

16. The first communication device of claim 10, wherein the one or more IC devices are configured to generate the second portion of the wakeup packet to include at least a portion of a network identifier corresponding to a broadcast address.

17. The first communication device of claim 10, wherein the one or more IC devices are configured to generate the second OFDM symbol to include signals that enable the one or more low power wakeup radios at the respective one or more second communication devices to perform at least one of i) receiver gain adjustment, and ii) synchronization.

18. The first communication device of claim 10, wherein the one or more IC devices are configured to:
generate the first OFDM symbol according to a binary phase shift keying (BPSK) modulation scheme; and
generate the second OFDM symbol according to the BPSK modulation scheme.

19. The first communication device of claim 10, wherein the wireless network interface device comprises one or more transceivers.

20. The first communication device of claim 19, further comprising:
one or more antennas coupled to the one or more transceivers.

* * * * *